(12) United States Patent
VanBlon et al.

(10) Patent No.: US 11,216,065 B2
(45) Date of Patent: Jan. 4, 2022

(54) INPUT CONTROL DISPLAY BASED ON EYE GAZE

(71) Applicant: LENOVO (Singapore) PTE. LTD., New Tech Park (SG)

(72) Inventors: Russell Speight VanBlon, Raleigh, NC (US); Mark Patrick Delaney, Raleigh, NC (US); Nathan J. Peterson, Oxford, NC (US); John Carl Mese, Cary, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/584,349

(22) Filed: Sep. 26, 2019

(65) Prior Publication Data

US 2021/0096641 A1   Apr. 1, 2021

(51) Int. Cl.
*G06F 3/01* (2006.01)
*G06F 3/0482* (2013.01)
*G06F 3/0487* (2013.01)

(52) U.S. Cl.
CPC .............. *G06F 3/013* (2013.01); *G06F 3/017* (2013.01); *G06F 3/0482* (2013.01); *G06F 3/0487* (2013.01)

(58) Field of Classification Search
CPC ........ G06F 3/013; G06F 3/017; G06F 3/0482; G06F 3/0487; G06F 3/01; G06F 3/0481
See application file for complete search history.

(56) References Cited

U.S. PATENT DOCUMENTS

| | | | | |
|---|---|---|---|---|
| 5,712,732 A | * | 1/1998 | Street | G02B 27/0093 359/630 |
| 5,912,721 A | * | 6/1999 | Yamaguchi | G06K 9/0061 351/209 |
| 6,409,601 B2 | * | 6/2002 | Ogata | A63F 13/06 463/37 |
| 6,542,091 B1 | * | 4/2003 | Rasanen | G06F 3/0219 341/22 |
| 6,921,336 B1 | * | 7/2005 | Best | A63F 13/10 463/32 |
| 7,130,447 B2 | * | 10/2006 | Aughey | A61B 3/113 382/103 |
| 7,556,377 B2 | * | 7/2009 | Beymer | A61B 3/113 351/205 |
| 7,561,143 B1 | * | 7/2009 | Milekic | G06F 3/013 345/156 |

(Continued)

*Primary Examiner* — Jung-Mu T Chuang
(74) *Attorney, Agent, or Firm* — Kunzler Bean & Adamson

(57) ABSTRACT

Apparatuses, methods, systems, and program products are disclosed for input control display based on eye gaze. An apparatus includes an eye-tracking device, an input device, a processor, and a memory that stores code executable by the processor. The code is executable to track an eye gaze of a user in relation to a display using the eye-tracking device, determine one or more interface controls presented on the display that are within an area of the user's eye gaze, and dynamically map the determined one or more interface controls to one or more corresponding input controls on the input device such that actuation of an input control on the input device activates the corresponding interface control presented on the display.

20 Claims, 6 Drawing Sheets

(56) References Cited

U.S. PATENT DOCUMENTS

| | | | | |
|---|---|---|---|---|
| 7,612,685 B2* | 11/2009 | Harris | G08C 17/02 | 340/12.28 |
| 7,669,770 B2* | 3/2010 | Wheeler | G06F 3/0238 | 235/472.01 |
| 7,895,532 B2* | 2/2011 | Scott | H04N 21/25891 | 715/810 |
| 7,899,915 B2* | 3/2011 | Reisman | H04N 21/4316 | 709/228 |
| 8,012,017 B2* | 9/2011 | York | A63F 13/42 | 463/31 |
| 8,094,123 B2* | 1/2012 | Enright | G06F 3/0383 | 345/161 |
| 8,105,142 B2* | 1/2012 | Ishihata | A63F 13/10 | 463/1 |
| 8,157,654 B2* | 4/2012 | Link | A63F 13/10 | 463/43 |
| 8,382,591 B2* | 2/2013 | Toy | A63F 13/355 | 463/37 |
| 8,408,706 B2* | 4/2013 | Yahav | A61B 3/113 | 351/210 |
| 8,493,390 B2* | 7/2013 | Kalinli | H04N 19/167 | 345/428 |
| 8,676,824 B2* | 3/2014 | Tavor | G06F 40/129 | 707/759 |
| 8,775,964 B2* | 7/2014 | Hayashi | A63F 13/537 | 715/773 |
| 8,840,472 B2* | 9/2014 | Toy | A63F 13/10 | 463/37 |
| 8,933,912 B2* | 1/2015 | Ambrus | G06F 3/0425 | 345/175 |
| 9,024,733 B2* | 5/2015 | Wouters | G08C 19/28 | 340/12.23 |
| 9,122,394 B2* | 9/2015 | Funabashi | G06F 3/04886 | |
| 9,155,960 B2* | 10/2015 | Argiro | A63F 13/98 | |
| 9,218,056 B2* | 12/2015 | Lee | G06F 3/013 | |
| 9,244,539 B2* | 1/2016 | Venable | G06F 3/012 | |
| 9,256,785 B2* | 2/2016 | Qvarfordt | G06K 9/00617 | |
| 9,262,073 B2* | 2/2016 | Howard | A63F 13/2145 | |
| 9,285,874 B2* | 3/2016 | Bychkov | G06F 3/011 | |
| 9,295,912 B2* | 3/2016 | Garvin | A63F 13/422 | |
| 9,377,863 B2* | 6/2016 | Bychkov | G06F 3/0488 | |
| 9,430,041 B2* | 8/2016 | Leigh | G06F 3/013 | |
| 9,459,694 B2* | 10/2016 | Haddon | G06F 3/0486 | |
| 9,612,709 B2* | 4/2017 | Shin | A63F 13/22 | |
| 9,613,487 B2* | 4/2017 | Kelly | A63F 13/52 | |
| 9,691,219 B1* | 6/2017 | Froy | G07F 17/3206 | |
| 9,817,474 B2* | 11/2017 | George-Svahn | B60K 37/06 | |
| 9,936,195 B2* | 4/2018 | Horesh | G06F 3/04842 | |
| 9,958,941 B2* | 5/2018 | Gustafsson | G06F 3/012 | |
| 9,996,150 B2* | 6/2018 | Swaminathan | G06F 3/0481 | |
| 10,031,578 B2* | 7/2018 | Bychkov | G06F 3/013 | |
| 10,078,382 B2* | 9/2018 | Furtwangler | G06F 3/0487 | |
| 10,481,304 B2* | 11/2019 | Wijaya | G02B 3/005 | |
| 10,613,808 B2* | 4/2020 | Bernstein | G06F 3/04817 | |
| 10,908,812 B2* | 2/2021 | Cheung | A63F 13/22 | |
| 2003/0048205 A1* | 3/2003 | He | G06F 1/1662 | 341/26 |
| 2003/0229900 A1* | 12/2003 | Reisman | H04N 21/42204 | 725/87 |
| 2004/0157664 A1* | 8/2004 | Link | A63F 13/77 | 463/43 |
| 2004/0237052 A1* | 11/2004 | Allport | G06F 1/1626 | 715/840 |
| 2005/0052423 A1* | 3/2005 | Harris | G08C 23/04 | 345/169 |
| 2005/0280603 A1* | 12/2005 | Aughey | G06F 3/013 | 345/8 |
| 2006/0005156 A1* | 1/2006 | Korpipaa | G06F 3/017 | 717/100 |
| 2006/0161865 A1* | 7/2006 | Scott | H04N 21/25891 | 715/810 |
| 2007/0051792 A1* | 3/2007 | Wheeler | G06F 3/0238 | 235/375 |
| 2007/0124372 A1* | 5/2007 | Liu | G06F 3/023 | 709/204 |
| 2007/0270226 A1* | 11/2007 | York | A63F 13/48 | 463/43 |
| 2008/0288878 A1* | 11/2008 | Hayashi | G06F 3/04886 | 715/762 |
| 2008/0297372 A1* | 12/2008 | Wouters | G08C 19/28 | 340/12.23 |
| 2009/0086165 A1* | 4/2009 | Beymer | A61B 3/113 | 351/210 |
| 2009/0118001 A1* | 5/2009 | Kelly | G07F 17/3286 | 463/29 |
| 2009/0183098 A1* | 7/2009 | Casparian | G06F 3/04886 | 715/765 |
| 2009/0305789 A1* | 12/2009 | Patil | A63F 13/10 | 463/42 |
| 2010/0073283 A1* | 3/2010 | Enright | G06F 3/0383 | 345/156 |
| 2010/0095346 A1* | 4/2010 | Pal | H04N 21/47 | 725/151 |
| 2011/0009195 A1* | 1/2011 | Porwal | A63F 13/426 | 463/37 |
| 2011/0028194 A1* | 2/2011 | Tang | G06F 3/03543 | 463/1 |
| 2011/0084904 A1* | 4/2011 | Tan | G06F 3/0238 | 345/163 |
| 2011/0118028 A1* | 5/2011 | Sobel | G06F 21/32 | 463/37 |
| 2011/0175932 A1* | 7/2011 | Yu | G06F 3/02 | 345/661 |
| 2011/0285636 A1* | 11/2011 | Howard | A63F 13/2145 | 345/173 |
| 2011/0300934 A1* | 12/2011 | Toy | A63F 13/533 | 463/31 |
| 2012/0146891 A1* | 6/2012 | Kalinli | H04N 19/115 | 345/156 |
| 2012/0147328 A1* | 6/2012 | Yahav | G06K 9/00604 | 351/210 |
| 2012/0220372 A1* | 8/2012 | Cheung | A63F 13/22 | 463/37 |
| 2013/0031515 A1* | 1/2013 | Funabashi | G06F 3/04886 | 715/863 |
| 2013/0145304 A1* | 6/2013 | Luca | G06F 3/013 | 715/781 |
| 2013/0190083 A1* | 7/2013 | Toy | A63F 13/2145 | 463/31 |
| 2013/0201305 A1* | 8/2013 | Sibecas | H04N 5/44591 | 348/54 |
| 2013/0207895 A1* | 8/2013 | Lee | G06F 3/013 | 345/158 |
| 2013/0283208 A1* | 10/2013 | Bychkov | G06F 3/013 | 715/810 |
| 2013/0303281 A1* | 11/2013 | Argiro | A63F 13/428 | 463/31 |
| 2014/0011584 A1* | 1/2014 | Shin | A63F 13/22 | 463/31 |
| 2014/0028548 A1* | 1/2014 | Bychkov | G06F 3/013 | 345/156 |
| 2014/0172373 A1* | 6/2014 | Edwards | G06F 3/011 | 702/189 |
| 2014/0184550 A1* | 7/2014 | Hennessey | G06F 3/013 | 345/173 |
| 2015/0213214 A1* | 7/2015 | Patak | G09B 21/009 | 715/727 |
| 2015/0277710 A1* | 10/2015 | Lee | G06F 3/0488 | 715/822 |
| 2015/0324645 A1* | 11/2015 | Jang | G06F 3/015 | 345/633 |
| 2016/0030835 A1* | 2/2016 | Argiro | G06F 3/016 | 463/33 |
| 2016/0070424 A1* | 3/2016 | Furtwangler | G06F 3/038 | 715/822 |
| 2016/0134863 A1* | 5/2016 | Horesh | G06K 9/00604 | 348/78 |
| 2016/0256784 A1* | 9/2016 | Schultz | A63F 13/355 | |
| 2016/0370860 A1* | 12/2016 | Bychkov | G06F 3/013 | |

(56) References Cited

U.S. PATENT DOCUMENTS

| | | | |
|---|---|---|---|
| 2017/0010847 A1* | 1/2017 | Bernstein | G06F 1/1662 |
| 2017/0032137 A1* | 2/2017 | Landqvist | G06K 9/0061 |
| 2017/0068316 A1* | 3/2017 | Seok | G06F 3/0237 |
| 2017/0090562 A1* | 3/2017 | Gustafsson | G06K 9/00604 |
| 2017/0090563 A1* | 3/2017 | Gustafsson | G02B 27/0179 |
| 2017/0316264 A1* | 11/2017 | Gustafsson | G06F 3/013 |
| 2018/0003991 A1* | 1/2018 | Guillaumee | G02B 27/0179 |
| 2018/0161683 A1* | 6/2018 | Thomas | H04L 51/04 |
| 2018/0350150 A1* | 12/2018 | Powderly | G06F 3/011 |
| 2018/0372923 A1* | 12/2018 | Wijaya | G02B 27/0179 |
| 2019/0056785 A1* | 2/2019 | Suk | G06F 16/436 |
| 2019/0099660 A1* | 4/2019 | Nelson | G07F 17/3246 |
| 2019/0163267 A1* | 5/2019 | Hainzl | G02B 27/0977 |
| 2020/0097096 A1* | 3/2020 | Chen | H04N 21/44218 |
| 2020/0186375 A1* | 6/2020 | Faulkner | H04L 63/104 |

\* cited by examiner

INPUT CONTROL DISPLAY BASED ON EYE GAZE

FIELD

The subject matter disclosed herein relates to input controls and more particularly relates to presenting input controls on a display based on a user's eye gaze.

BACKGROUND

Applications may present on-screen controls for controlling the application, selecting different features of the application, or the like. It can be frustrating and time consuming to navigate through multiple on-screen controls one at a time using a physical input device such as a remote control, a controller, or the like.

BRIEF SUMMARY

Apparatuses, methods, systems, and program products are disclosed for input control display based on eye gaze. An apparatus, in one embodiment, includes an eye-tracking device, an input device, a processor, and a memory that stores code executable by the processor. The code, in certain embodiments, is executable to track an eye gaze of a user in relation to a display using the eye-tracking device, determine one or more interface controls presented on the display that are within an area of the user's eye gaze, and dynamically map the determined one or more interface controls to one or more corresponding input controls on the input device such that actuation of an input control on the input device activates the corresponding interface control presented on the display.

A method, in one embodiment, for input control display based on eye gaze includes tracking an eye gaze of a user in relation to a display using an eye-tracking device, determining one or more interface controls presented on the display that are within an area of the user's eye gaze, and dynamically mapping the determined one or more interface controls to one or more corresponding input controls on an input device such that actuation of an input control on the input device activates the corresponding interface control presented on the display.

A program product for input control display based on eye gaze, in one embodiment, includes a computer readable storage medium that stores code executable by a processor. In one embodiment, the code is executable by the processor to track an eye gaze of a user in relation to a display using an eye-tracking device, determine one or more interface controls presented on the display that are within an area of the user's eye gaze, and dynamically map the determined one or more interface controls to one or more corresponding input controls on an input device such that actuation of an input control on the input device activates the corresponding interface control presented on the display.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
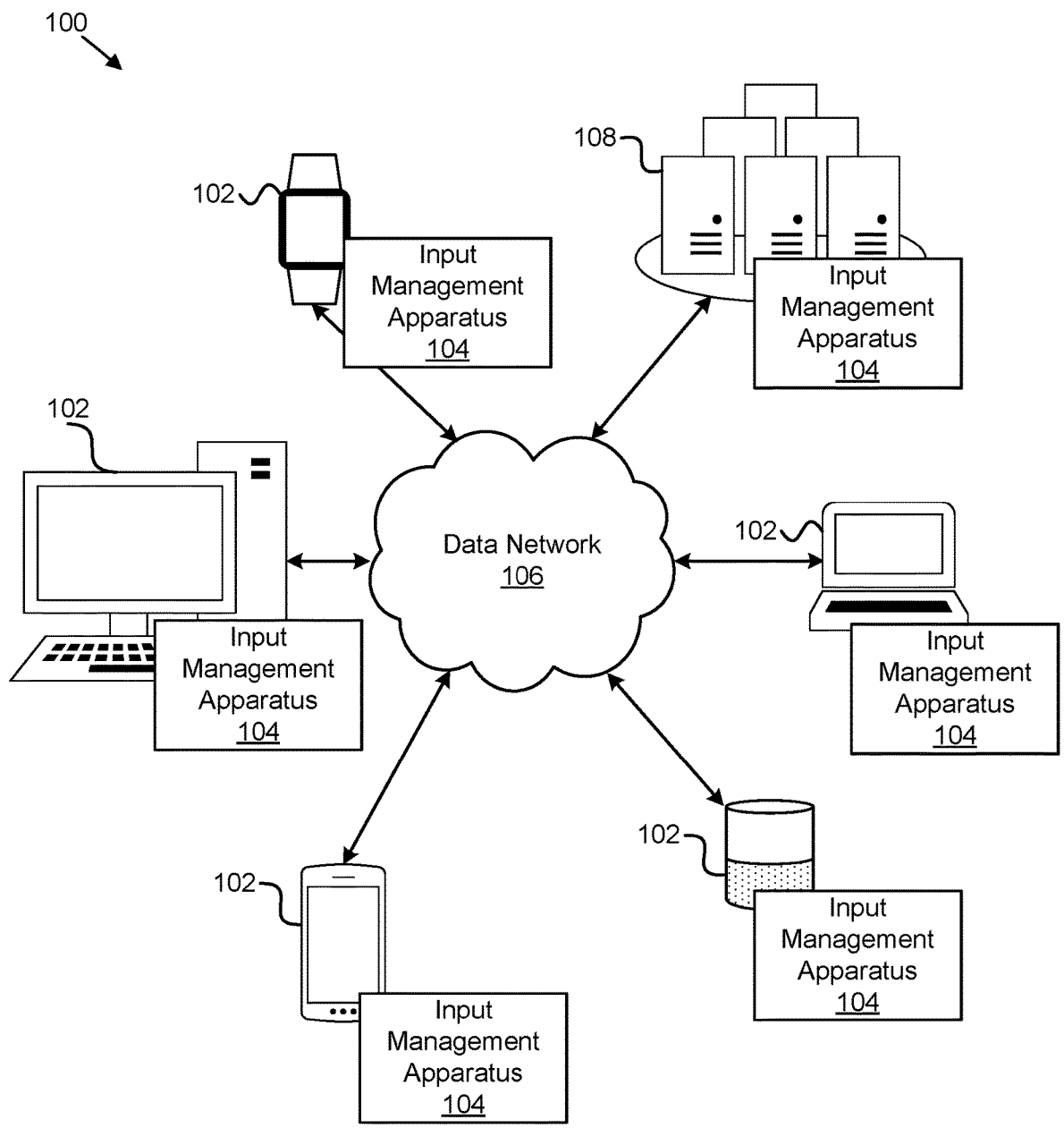
FIG. 1 is a schematic block diagram illustrating one embodiment of a system for input control display based on eye gaze.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes an eye-tracking device, an input device, a processor, and a memory that stores code executable by the processor. The code, in certain embodiments, is executable to track an eye gaze of a user in relation to a display using the eye-tracking device, determine one or more interface controls presented on the display that are within an area of the user's eye gaze, and dynamically map the determined one or more interface controls to one or more corresponding input controls on the input device such that actuation of an input control on the input device activates the corresponding interface control presented on the display.

In one embodiment, the code is further executable by the processor to display interface graphics on the display representing the one or more input controls of the input device that correspond to the one or more interface controls. The interface graphics may be displayed in a manner that shows the correspondence between the one or more input controls and the one or more interface controls.

In further embodiments, the interface graphics for the one or more input controls are presented adjacent to the one or more corresponding interface controls on the display. In some embodiments, the interface graphics for the one or more input controls are presented overlaying the one or more corresponding interface controls on the display.

In various embodiments, the one or more interface graphics for the one or more input controls are displayed using graphics that resemble characteristics of the input controls on the input device. In one embodiment, the characteristics of the interface graphics for the one or more input controls are selected from the group comprising a shape, a size, a layout, and a color of the one or more input controls.

In certain embodiments, the code is further executable to communicate with the input device to query the input device for information that identifies the characteristics of the one or more input controls of the input device. In further embodiments, the code is further executable by the processor to logically divide the display into one or more logical areas such that when a user's eye gaze moves into a logical area the one or more interface graphics for the one or more input controls are displayed for the one or more corresponding interface controls within the logical area.

In one embodiment, the code is further executable by the processor to remove one or more interface graphics for the one or more input controls that are displayed for one or more interface controls within a logical area in response to the user's eye gaze moving out of the logical area. In certain embodiments, the code is further executable by the processor to dynamically determine a number of logical areas to divide the display into based on one or more of a number of interface controls presented on the display and a distance of a user from the display.

In one embodiment, the code is further executable by the processor to assign the interface graphics for the one or more input controls to the one or more interface controls according to a layout of the input controls on the input device. In further embodiments, the input device further comprises a wireless pointing device where a focus of the wireless pointing device is an area of the display where the user's eye gaze is detected.

A method, in one embodiment, for input control display based on eye gaze includes tracking an eye gaze of a user in relation to a display using an eye-tracking device, determining one or more interface controls presented on the display that are within an area of the user's eye gaze, and dynamically mapping the determined one or more interface controls to one or more corresponding input controls on an input device such that actuation of an input control on the input device activates the corresponding interface control presented on the display.

In one embodiment, the method includes displaying interface graphics on the display representing the one or more input controls of the input device that correspond to the one or more interface controls. The interface graphics may be displayed in a manner that shows the correspondence between the one or more input controls and the one or more interface controls.

In one embodiment, the one or more interface graphics for the one or more input controls are displayed using graphics that resemble characteristics of the input controls on the input device. The characteristics may be selected from the group comprising a shape, a size, a layout, and a color of the one or more input controls.

In one embodiment, the method includes communicating with the input device to query the input device for information that identifies the characteristics of the one or more input controls of the input device. In certain embodiments, the method includes logically dividing the display into one or more logical areas such that when a user's eye gaze moves into a logical area the one or more interface graphics for the one or more input controls are displayed for the one or more corresponding interface controls within the logical area.

In one embodiment, the method includes dynamically determining a number of logical areas to divide the display into based on one or more of a number of interface controls presented on the display and a distance of a user from the display. In certain embodiments, the input device further comprises a wireless pointing device where a focus of the pointing device is an area of the display where the user's eye gaze is detected.

A program product for input control display based on eye gaze, in one embodiment, includes a computer readable storage medium that stores code executable by a processor. In one embodiment, the code is executable by the processor to track an eye gaze of a user in relation to a display using an eye-tracking device, determine one or more interface controls presented on the display that are within an area of the user's eye gaze, and dynamically map the determined one or more interface controls to one or more corresponding input controls on an input device such that actuation of an input control on the input device activates the corresponding interface control presented on the display.

FIG. 1 is a schematic block diagram illustrating one embodiment of a system 100 for input control display based on eye gaze. In one embodiment, the system 100 includes one or more information handling devices 102, one or more input management apparatuses 104, one or more data networks 106, and one or more servers 108. In certain embodiments, even though a specific number of information handling devices 102, input management apparatuses 104, data networks 106, and servers 108 are depicted in FIG. 1, one of skill in the art will recognize, in light of this disclosure, that any number of information handling devices 102, input management apparatuses 104, data networks 106, and servers 108 may be included in the system 100.

In one embodiment, the system 100 includes one or more information handling devices 102. The information handling devices 102 may include one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In certain embodiments, the information handling devices 102 are communicatively coupled to one or more other information handling devices 102 and/or to one or more servers 108 over a data network 106, described below. The information handling devices 102, in a further embodiment, may include processors, processor cores, and/or the like that are configured to execute various programs, program code, applications, instructions, functions, and/or the like. The information handling devices 102 may be coupled to one or more display devices, may have one or more integrated display devices, and/or the like. The display devices may include touch displays, televisions, computer monitors, laptop monitors, and/or the like.

In certain embodiments, one or more input devices may be communicatively connected to an information handling device 102. The input devices may include a mouse, a remote control, a gaming controller, a smart phone, a universal remote, and/or the like that is communicatively coupled to an information handling device 102 over a wired (e.g., USB) or wireless (e.g., Bluetooth®, NFC, infrared, Wi-Fi, or the like) connection.

In further embodiments, an eye-tracking device is connected to an information handling device 102. An eye-tracking device may be a device that is externally connected to or integrated with an information handling device 102 and is capable of capturing and tracking a user's eye gaze. Examples may include a camera such as a digital camera, a video camera, a camera with a telephoto lens, a camera with a widescreen lens, a cell phone camera such as a front-facing camera and/or a rear-facing camera, a web cam, and/or the like.

In one embodiment, the input management apparatus 104 is configured to track an eye gaze of a user in relation to a display using the eye-tracking device, determine one or more interface controls presented on the display that are within an area of the user's eye gaze, and dynamically map the determined one or more interface controls to one or more corresponding input controls on the input device such that actuation of an input control on the input device activates the corresponding interface control presented on the display. The input management apparatus 104, including its various sub-modules, may be located on one or more information handling devices 102 in the system 100, one or more servers 108, one or more network devices, and/or the like. The input management apparatus 104 is described in more detail below with reference to FIGS. 2 and 3.

In various embodiments, the input management apparatus 104 may be embodied as a hardware appliance that can be installed or deployed on an information handling device 102, on a server 108, on a user's mobile device, on a display, or elsewhere on the data network 106. In certain embodiments, the input management apparatus 104 may include a hardware device such as a secure hardware dongle or other hardware appliance device (e.g., a set-top box, a network appliance, or the like) that attaches to a device such as a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the input management apparatus 104 may include a power interface, a wired and/or wireless network interface, a graphical interface that attaches to a display, and/or a semiconductor integrated circuit device as described below, configured to perform the functions described herein with regard to the input management apparatus 104.

The input management apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the input management apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the input management apparatus 104.

The semiconductor integrated circuit device or other hardware appliance of the input management apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the input management apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102.

Figure 2:
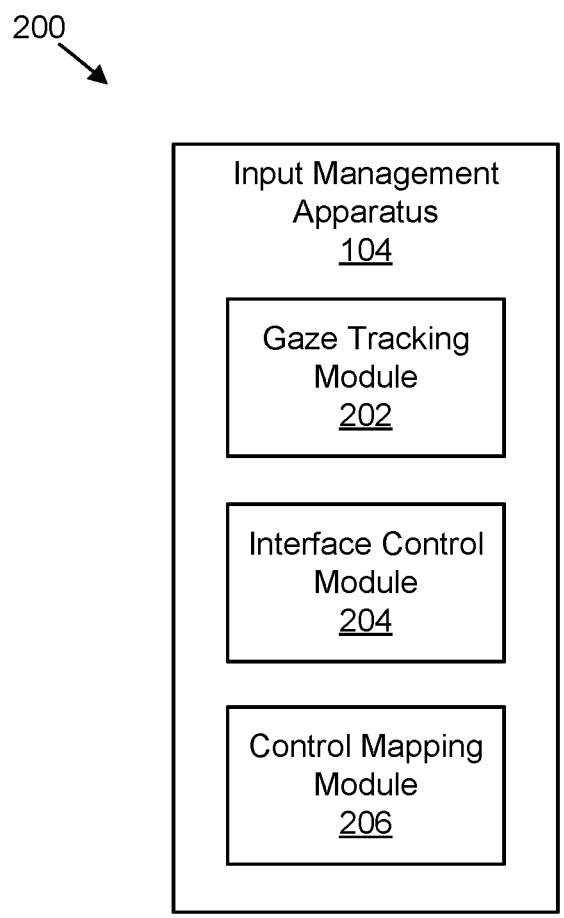
FIG. 2 is a schematic block diagram illustrating one embodiment of an apparatus for input control display based on eye gaze.

FIG. 2 is a schematic block diagram illustrating one embodiment of an apparatus 200 for input control display based on eye gaze. The apparatus 200, in one embodiment, includes an instance of an input management apparatus 104. The input management apparatus 104, in certain embodiments, includes one or more of a gaze tracking module 202, an interface control module 204, and/or a control mapping module 206, which are described in more detail below.

The gaze tracking module 202, in one embodiment, is configured to track an eye gaze of a user in relation to a display using the eye-tracking device. For instance, the gaze tracking module 202 may use facial recognition technology, image processing technology, or the like to identify the user's eyes in images or videos that are captured using the eye-tracking device, and track where the user is looking relative to the display.

For example, the eye-tracking device may know its location relative to the display and the gaze tracking module 202 may determine the user's position relative to the display (e.g., using sensors such as proximity, infrared, or motion sensors). The gaze tracking module 202 may track a direction that the user is looking relative to the display device, and based on the distance between the user and the display device, may determine a field of view of the user to determine a portion of the display device that is within the field of view of the user's eye gaze. The gaze tracking module 202 may identify the portion of the display that the user is looking at using display coordinates (e.g., x-y coordinates, describing the area using pixel identifiers or values, determining a logical area of the display (described below), and/or the like.

The interface control module 204, in one embodiment, is configured to determine one or more interface controls that are presented on the display that are within an area of the user's eye gaze. For example, the interface control module 204 may determine which applications have windows open that are shown on the display (e.g., not hidden or minimized), and that correspond to the location/field of view of the user's eye gaze in relation to the display device. The interface control module 204, upon determining the application windows that are visible within the user's field of view, may further determine interface controls that are visible. As used herein, interface controls may refer to interactive graphical elements that a user can interact with to trigger an action within an application's interface. Examples of interface controls can include such elements as menus, buttons, check boxes, drop-down lists, hyperlinks, interactive videos, social media elements (e.g., "like button"), and/or the like.

For instance, the interface control module 204 may query the operating system for the universally or globally unique identifiers ("UUID" or "GUID") for the application window (s) of the visible window(s) that is/are within the field of view of the user, and then may further query the operating system for the UUIDs/GUIDs of one or more interface controls (e.g., graphical menu items, buttons, radio boxes, check boxes, text boxes, and/or the like) that are visible within the visible application windows in order to identify the interface controls.

In one embodiment, the control mapping module 206 is configured to dynamically map the determined one or more interface controls to one or more corresponding input controls on the input device such that actuation of an input control on the input device activates the corresponding interface control presented on the display. For example, the input device may be a remote control that has a keypad with buttons for each number 0 through 9. Accordingly, the control mapping module 206 may dynamically map each physical button, 0 through 9, on the remote control to an interface control presented on the display within the field of view of the user's eye gaze.

For example, a user may be looking at an application that has interface controls, e.g., selectable menu items, along the top of the application window presented on a display that is the focus of the user's eye gaze. The user may also be using a keyboard to provide input to the information handling device 102 that is connected to the display. Based on the user's eye gaze and the menu items that are within the field of view of the user's eye gaze, the control mapping module 206 may dynamically map one or more buttons of the keyboard to separate menu items presented in the application window such that actuation of the keyboard button that is mapped to a menu item will activate or trigger the menu item on the display.

In certain embodiments, as the user's gaze moves around the display, the gaze tracking module 202 tracks the location of the user's eye gaze on the display and the interface control module 204 determines interface controls on the display that are within the field of view of the user's eye gaze. The control mapping module 206 then dynamically maps one or more physical input controls on the input device to the interface controls on the display that are within the field of the view of the user's eye gaze.

In some embodiments, to prevent constant mapping of the input controls on the input device to the interface controls on the display as the user looks around the display, the control mapping module 206 may pause or wait a certain period of time after the user's eye gaze is maintained within a certain area on the display (e.g., a second or two) before mapping the input controls of the input device to the interface controls on the display, which conservers processing power and constant updating of the mapping while the user is looking around the display.

The control mapping module 206 may store the current mapping of input controls to interface controls as a data structure such as a log file, a database, a data table, an array, a list, a linked-list, or the like and may dynamically update the data structure as the user's eye gaze moves around the display. The mapping may be stored in volatile memory such as a register, a cache, RAM, or the like for fast data storage and access (as opposed to slower non-volatile storage).

Figure 3:
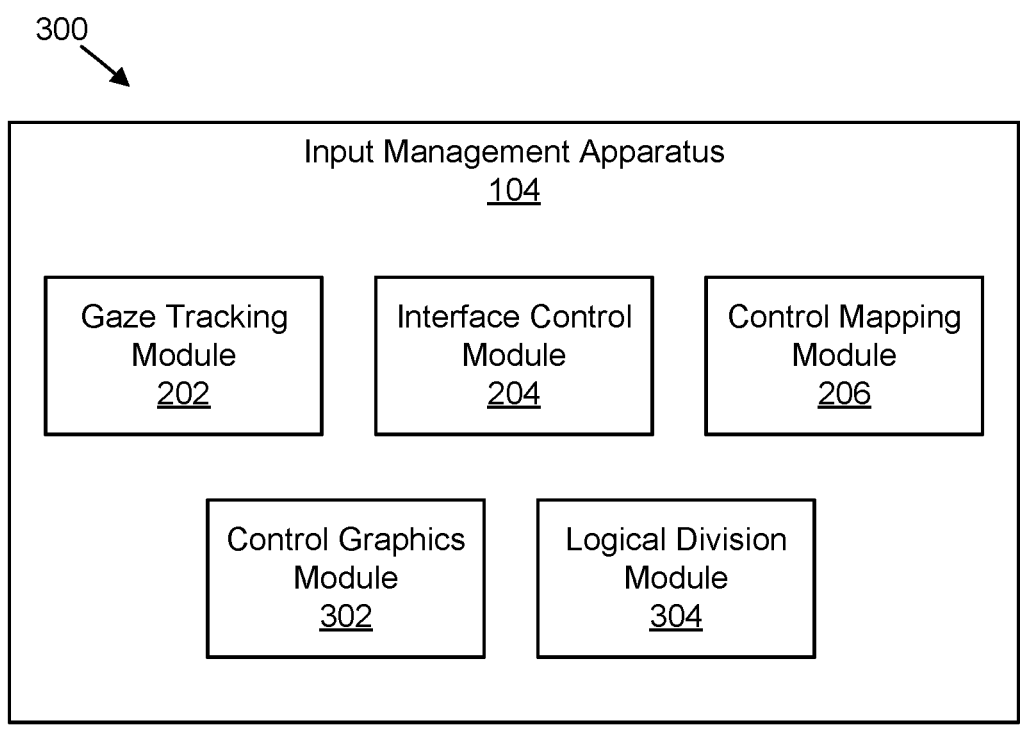
FIG. 3 is a schematic block diagram illustrating one embodiment of another apparatus for input control display based on eye gaze.

FIG. 3 is a schematic block diagram illustrating one embodiment of another apparatus 300 for input control display based on eye gaze. In one embodiment, the apparatus 300 includes an instance of an input management apparatus 104. The input management apparatus 104, in certain embodiments, includes one or more of a gaze tracking module 202, an interface control module 204, and a control mapping module 206, which may be substantially similar to the tracking module 202, the interface control module 204, and the control mapping module 206 described above with reference to FIG. 2. In further embodiments, the input management apparatus 104 includes one or more of a control graphics module 302 and a logical division module 304, which are described in more detail below.

In one embodiment, the control graphics module 302 is configured to display interface graphics on the display representing the one or more input controls of the input device that correspond to the one or more interface controls. In some embodiments, the control graphics module 302 displays the interface graphics in a manner that shows the correspondence between the one or more input controls and the one or more interface controls.

Continuing with the example above, using the remote with the 0-9 keypad, the control graphics module 302 may display, overlay, present, or the like a graphical element that represents a 0-9 button on the remote on, proximate to, adjacent to, or the like an interface control that the control mapping module 206 maps to the input control. In this manner, the user can see which input control on the input device, e.g., which physical button is associated with which interface control on the display.

In one embodiment, the control graphics module 302 displays the one or more interface graphics for the one or more input controls using graphics that resemble characteristics of the input controls on the input device. The characteristics of the interface graphics may include a shape, a color, a size, a layout of the buttons on the input device, and/or the like. For instance, if a remote control is used that has round buttons representing 0-9 that are blue, the control graphics module 302 may present substantially similar graphical representations of the buttons on the display, e.g., round icons or graphics that include a number within the icon/graphic and that is blue, overlaying or adjacent to the corresponding interface control.

Other graphics may be used that have designs that are specific to certain input devices such as gaming controller buttons (e.g., A, B, X, Y buttons on an Xbox® controller; triangle, square, circle, cross buttons on a PlayStation® controller; or the like); streaming set-top box remote controls (e.g., buttons on a Roku® remote control; buttons on an Apple TV® remote control; buttons on a Google Chromecast® remote control; or the like); TV-specific remote controls (e.g., remote controls for television manufacturers and specific television models such as Samsung®, Sony®, LG®, and/or the like); universal remote controls; and/or the like.

In one embodiment, the control graphics module 302 is configured to communicate with the input device to query the input device for information that identifies the characteristics of the one or more input controls of the input device. For instance, the control graphics module 302 may communicate with a gaming controller over a wired or wireless connection, e.g., via a gaming console connected to the gaming controller, to determine one or more specifications for the gaming controller such as a type of gaming controller, a model of the gaming controller, a button layout for the gaming controller, and/or the like.

If the control graphics module 302 cannot determine information about the input controls of the input device (e.g., such as the number of buttons, types of buttons, appearance of buttons, layout of buttons, or the like), the control graphics module 302 may query a database of pre-populated input control information using the information from the input control, e.g., the serial number, manufacturer, model number, or the like, to find information about the input controls for the input device. Similarly, in certain embodiments, the control graphics module 302 may search the Internet or another network (e.g., the manufacturers website, a Google® search, or the like) for information about the input device based on the information from the input device (e.g., the serial number, model number, manufacturer, device type, or the like). For instance, the control graphics module 302 may query a manufacturer's website for the input device to determine a specification sheet or other description of the input device to determine buttons that are available on the input device, characteristics of the buttons such as a layout, size, design, color, or the like (e.g., determined by processing an image of the input device), and/or the like.

In some embodiments, the control mapping module 206 and/or the control graphics module 302 is configured to assign the interface graphics for the one or more input controls to the one or more interface controls according to a layout of the input controls on the input device. For instance, if a group of interface controls are laid out similar to the button layout of a gaming controller, then the control mapping module 206 may map the interface controls to the input controls in the same order as the input controls and the control graphics module 302 may display the interface graphics for the input controls on the interface controls in the same order as the button layout of the gaming controller.

In one embodiment, the logical division module 304 is configured to logically divide the display into one or more logical areas such that when a user's eye gaze moves into a logical area, the one or more interface graphics for the one or more input controls are displayed for the one or more corresponding interface controls within the logical area. For instance, the logical division module 304 may logically divide the display in half vertically or horizontally, into a 2×2, 3×3, 4×4, or the like grid, into a grid that has a different number of rows than columns and vice versa, and/or the like. In other words, the logical division module 304 creates logical areas on the display that set the boundaries of when to map input controls to the interface controls and also present interface graphics that represent the input controls on or adjacent to the interface controls.

Other ways that the logical division module 304 may be based on how the interface controls are grouped, clustered, or otherwise laid out on the display. For instance, if a group of four interface controls are located in the bottom right corner, and another group of menu items are located along the top of the display, and there are a few interface controls in the middle of the display, then the logical division module 304 may logically divide the display such that one area includes the interface controls in the bottom right corner of the display, another area includes the interface controls along the top of the display, and a third area includes the interface controls in the middle of the display.

In such an embodiment, the control mapping module 206 maps the input controls of the input device to the interface controls that are within logical area that the user's eye gaze is currently directed to. For instance, if the logical division module 304 logically divides a display into a 3×3 grid, and the gaze tracking module 202 detects that the user is looking at the middle area of the 3×3 grid, the interface control module 204 may determine which interface controls are within the middle area, the control mapping module 206 may map the determined interface controls (if any) for the middle area to the input controls of an input device, and the control graphics module 302 may present visual or graphical representations of the input controls of the input device on or adjacent to the interface controls such that actuation of the input controls on the input device triggers or signals activation of the corresponding interface control presented on the display.

In one embodiment, the control graphics module 302 is configured to remove the graphical representations of the input controls from being displayed within a logical area of the display in response to the user's eye gaze moving away/out of the logical area and into a different area (or off of the display). In this manner, the interface graphics are presented within a logical area where the user's eye gaze is detected and not in other areas of the display to prevent confusion about which interface control is going to be activated upon actuation of an input control associated with the interface control.

In further embodiments, the logical division module 304 may dynamically determine the number of logical areas to divide the display into based on the number of interface controls, the groupings of interface controls, the layout of interface controls, the distance of the user from the display, and/or the like. For instance, if the interface controls are all located on the left side of a display, then the logical division module 304 may logically divide the display such that the interface controls are all within the same area, or may divide the left side into different logical areas (e.g., one column that has four rows that each include different interface controls and then a single column that comprises the remainder of the display).

Similarly, if the user is sitting closer to the display, then the logical division module 304 may logically divide the display into more logical areas so that more interface controls can be mapped to input controls than if the user is sitting further away. For instance, if the user is sitting within five feet of the display, the logical division module 304 may divide the display into a 5×5 grid, whereas if the user is sitting further away from the display, the logical division module 304 may divide the display into a 3×3 grid, which may make the interface graphics easier to see from a further distance.

In certain embodiments, if the input device is a wireless pointing device (e.g., such as a Wii® gaming controller or other wireless pointing device), the focus of the aim of the wireless pointing device is an area of the display where the user's eye gaze is focused/detected. For instance, if the user's eye gaze is detected within a logical area that the logical division module 306 creates, the aim or focus of the wireless pointing device will be placed in that logical area and bounded by the bounds of the logical area until the user moves his/her eye gaze into a different logical area.

Figure 4A:
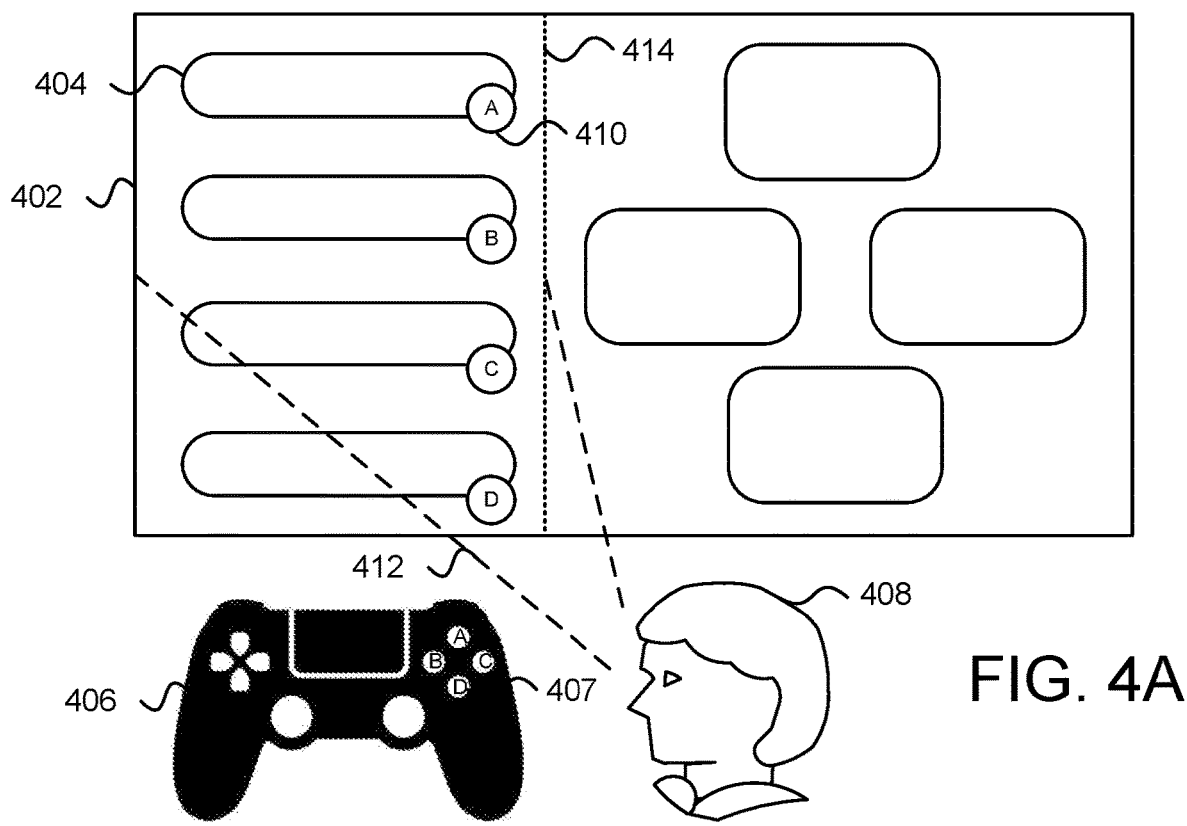
FIG. 4A is a schematic diagram illustrating one example embodiment for input control display based on eye gaze.
Figure 4B:
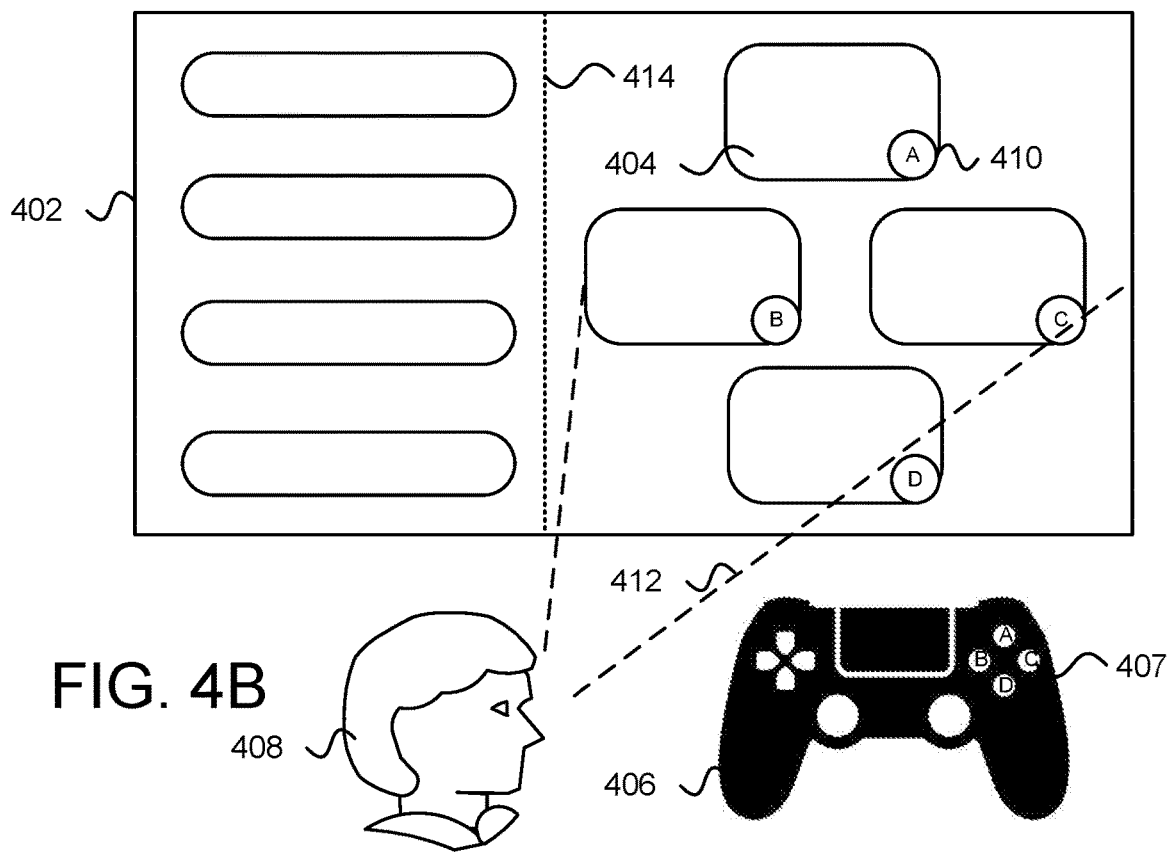
FIG. 4B is a schematic diagram illustrating another example embodiment for input control display based on eye gaze.

FIGS. 4A and 4B illustrate one example embodiment for input control display based on eye gaze. In one embodiment, the system includes a display 402 where one or more interface controls 404 are presented. The interface controls 404 may be menu items, buttons, drop-down menus, hyperlinks, or the like that are graphically presented for controlling or using different features of an application executing on an information handling device 102 connected to the display 402.

An input device 406 may be connected to an information handling device 102 and/or the display 402 for providing input. The input device 406 may include various physical buttons 407 for triggering actions in the application that are presented on the display 402. In one embodiment, a user 408 may be looking at a portion of the display 402 that includes four different interface controls 404. The gaze tracking module 202 may track the user's eye gaze and determine the user's field of view 412 relative to the display 402.

Based on the locations of the interface controls 404, the logical division module 304 logically divides the display area into one or more areas. For instance, as illustrated in FIG. 4A, the display 402 is logically divided into two separate areas by a vertical boundary 414. Based on the user's eye gaze and field of view 412, the interface control module 204 dynamically determines which interface controls 404 are within the logical area where the user's eye gaze is focused, and the control mapping module 206 dynamically maps one or more input controls 407 of the input device 406 to the interface controls 404.

In further embodiments, the control graphics module 302 dynamically presents interface graphics 410 that represent the input controls 407 of the input device 406 that are mapped to the corresponding interface controls 404 such that the user 408 can press the input control 407 that corresponds to the presented interface graphic 410 to trigger or activate the associated interface control 404 instead of requiring the user to navigate through the different interface controls 404 until the desired interface control 404 is selected.

Referring to FIG. 4B, the gaze tracking module 202 detects that the user 408 is looking at the other side of the display 402, and the interface control module 204 dynamically determines which interface controls 404 are presented in the logical area where the user 408 is looking. The control mapping module 206 dynamically maps the input controls 407 of the input device 406 to the interface controls 404. In some embodiments, the control mapping module 206 dynamically determines a layout of the input controls 407 on the input device 406 and maps the interface controls 404 to the input controls 407 such that the layout is the same or substantially similar. The control graphics module 302, in some embodiments, dynamically presents interface graphics 410 that represent the input controls 407, while also dynamically removing the display of the interface graphics 410 from the previous area where the user was looking, as illustrated in FIG. 4A.

Figure 5:
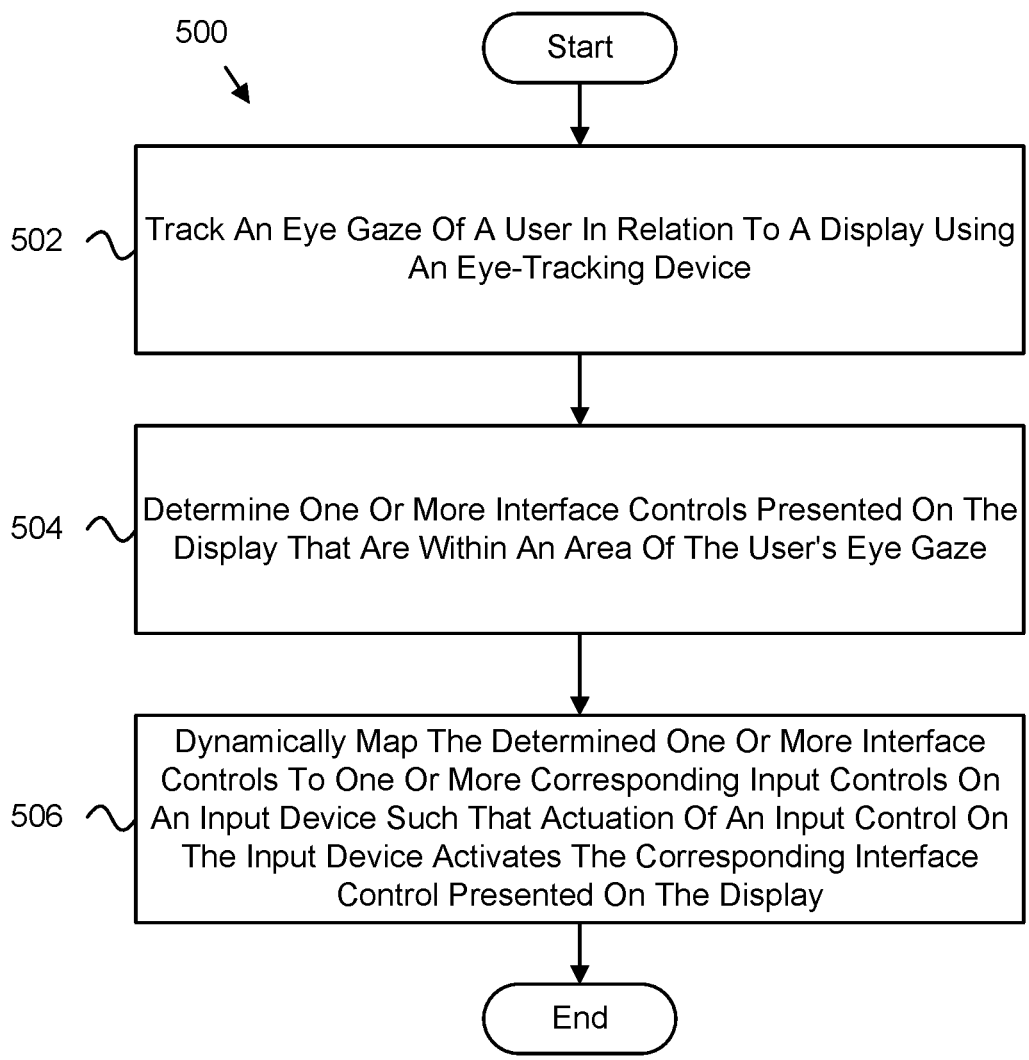
FIG. 5 is a schematic flow chart diagram illustrating one embodiment of a method for input control display based on eye gaze.

FIG. 5 is a schematic flow chart diagram illustrating one embodiment of a method 500 for input control display based on eye gaze. In one embodiment, the method 500 begins and tracks 502 an eye gaze of a user in relation to a display using the eye-tracking device. In further embodiments, the method 500 determines 504 one or more interface controls presented on the display that are within an area of the user's eye gaze. In certain embodiments, the method 500 dynamically maps 506 the determined one or more interface controls to one or more corresponding input controls on the input device such that actuation of an input control on the input device activates the corresponding interface control presented on the display, and the method 500 ends. In one embodiment, the gaze tracking module 202, the interface control module 204, and the control mapping module 206 perform the various steps of the method 500.

Figure 6:
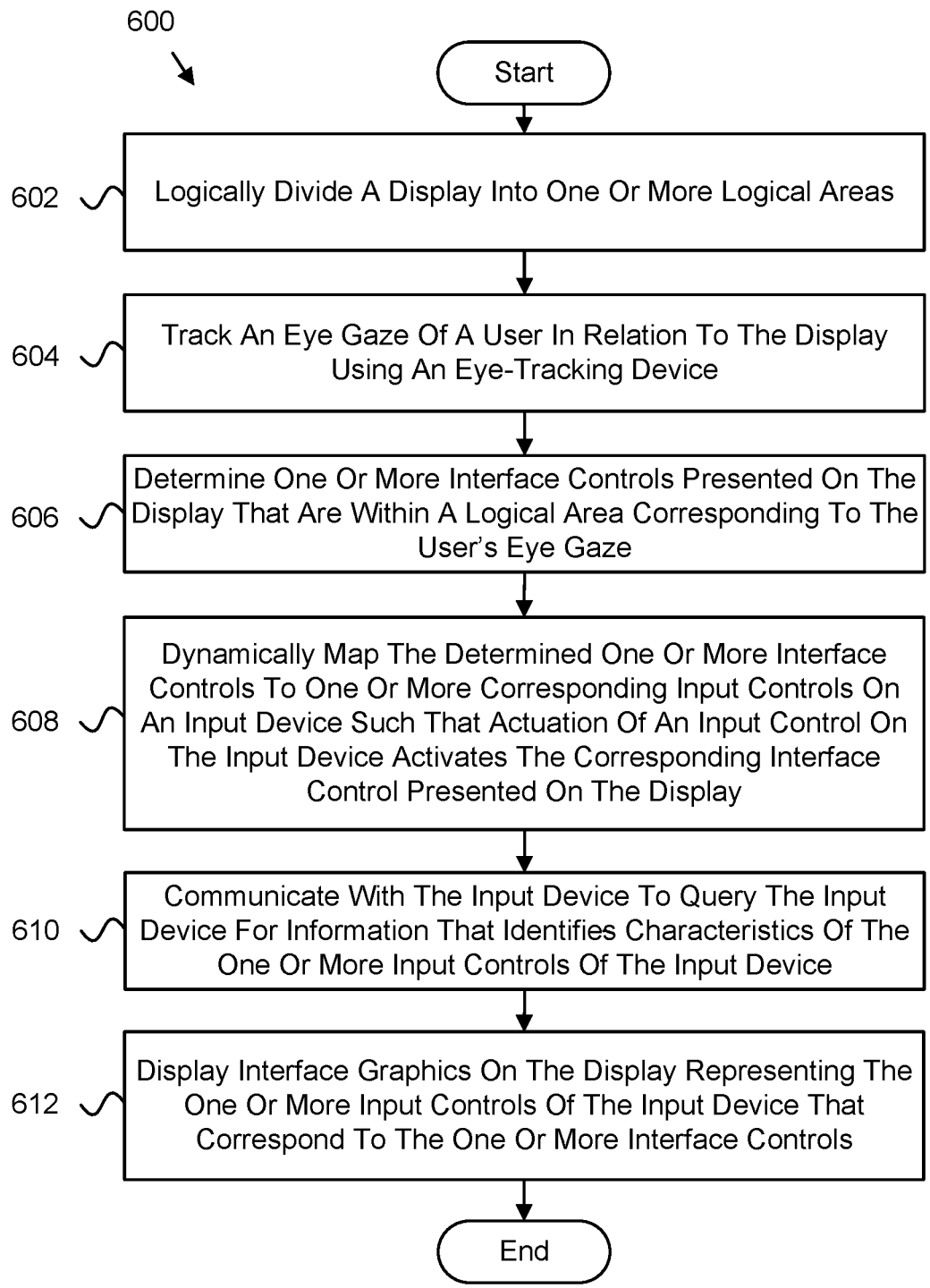
FIG. 6 is a schematic flow chart diagram illustrating one embodiment of a method for input control display based on eye gaze.

FIG. 6 is a schematic flow chart diagram illustrating one embodiment of a method 600 for input control display based on eye gaze. In one embodiment, the method 600 begins and logically divides 602 a display area into one or more logical areas. The method 600, in further embodiments, tracks 604 an eye gaze of a user in relation to the display using an eye-tracking device.

In some embodiments, the method 600 determines 606 one or more interface controls presented on the display that are within a logical area that corresponds to the user's eye gaze. The method 600, in one embodiment, dynamically maps 608 the determined one or more interface controls to one or more corresponding input controls on the input device such that actuation of an input control on the input device activates the corresponding interface control presented on the display.

In further embodiments, the method 600 communicates 610 with the input device to query the input device for information that identifies characteristics of the one or more input controls of the input device. The method 600, in some embodiments, displays 612 interface graphics on the display representing the one or more input controls of the input device that correspond to the one or more interface controls, and the method 600 ends. In one embodiment, the gaze tracking module 202, the interface control module 204, the control mapping module 206, the control graphics module 302, and the logical division module 304 perform the various steps of the method 600.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory that stores code executable by the processor to:
determine a field of view of a user based on a distance between the user and a display;
identify an area of the display that is within an eye gaze of the user in the determined field of view, the user's eye gaze being a portion of the user's field of view;
track the user's eye gaze in relation to the display using an eye-tracking device;
determine one or more interface controls presented on the display that are within the identified area of the user's eye gaze, the one or more interface controls comprising interactive graphical elements that trigger an action for an application;
dynamically map the determined one or more interface controls to one or more corresponding input controls on an input device such that actuation of an input control on the input device activates the corresponding interface control presented on the display in response to the user's eye gaze being maintained within the identified area of the display where the one or more interface controls are located for a predefined period of time; and
display interface graphics on the display that represent the one or more input controls of the input device that correspond to the one or more interface controls, the interface graphics for the one or more input controls comprise graphical icons that are displayed using graphics that have shapes and labels that map to the shapes and labels of the input controls on the input device.

2. The apparatus of claim 1, wherein the interface graphics are displayed in a manner that shows a correspondence between the one or more input controls and the one or more interface controls.

3. The apparatus of claim 2, wherein the interface graphics for the one or more input controls are presented adjacent to the one or more corresponding interface controls on the display.

4. The apparatus of claim 2, wherein the interface graphics for the one or more input controls are presented overlaying the one or more corresponding interface controls on the display.

5. The apparatus of claim 2, wherein the code is further executable by the processor to logically divide the display into one or more logical areas such that when a user's eye gaze moves into a logical area, the one or more interface graphics for the one or more input controls are displayed for the one or more corresponding interface controls within the logical area.

6. The apparatus of claim 5, wherein the code is further executable by the processor to remove one or more interface graphics for the one or more input controls that are displayed for one or more interface controls within a logical area in response to the user's eye gaze moving out of the logical area.

7. The apparatus of claim 5, wherein the code is further executable by the processor to dynamically determine a number of logical areas to divide the display into based on one or more of a number of interface controls presented on the display and a distance of a user from the display.

8. The apparatus of claim 2, wherein the code is further executable by the processor to assign the interface graphics for the one or more input controls to the one or more interface controls according to a layout of the input controls on the input device.

9. The apparatus of claim 1, wherein one or more characteristics of the interface graphics for the one or more input controls are selected from a group comprising a size, a layout, and a color of the one or more input controls.

10. The apparatus of claim 1, wherein the code is further executable to communicate with the input device to query the input device for first information that identifies one or more characteristics of the one or more input controls of the input device.

11. The apparatus of claim 10, wherein the code is executable by the processor to one of query a database of pre-populated input control information using the first information from the input device and search an Internet for second information about the input device based on the first information from the input device.

12. The apparatus of claim 1, wherein the input device comprises a wireless pointing device, a focus of the wireless pointing device being the identified area of the display where the user's eye gaze is detected.

13. A method, comprising:
  determining, by a processor, a field of view of a user based on a distance between the user and a display;
  identifying an area of the display that is within an eye gaze of the user in the determined field of view, the user's eye gaze being a portion of the user's field of view;
  tracking the user's eye gaze in relation to a display using an eye-tracking device;
  determining one or more interface controls presented on the display that are within the identified area of the user's eye gaze, the one or more interface controls comprising interactive graphical elements that trigger an action for an application;
  dynamically mapping the determined one or more interface controls to one or more corresponding input controls on an input device such that actuation of an input control on the input device activates the corresponding interface control presented on the display in response to the user's eye gaze being maintained within the identified area of the display where the one or more interface controls are located fora predefined period of time; and
  displaying interface graphics on the display that represent the one or more input controls of the input device that correspond to the one or more interface controls, the interface graphics for the one or more input controls comprise graphical icons that are displayed using graphics that have shapes and labels that map to the shapes and labels of the input controls on the input device.

14. The method of claim 13, wherein the interface graphics are displayed in a manner that shows a correspondence between the one or more input controls and the one or more interface controls.

15. The method of claim 14, wherein one or more characteristics of the interface graphics for the one or more input controls of the input device are selected from a group comprising a size, a layout, and a color of the one or more input controls.

16. The method of claim 15, further comprising communicating with the input device to query the input device for information that identifies the one or more characteristics of the interface graphics for the one or more input controls of the input device.

17. The method of claim 14, further comprising logically dividing the display into one or more logical areas such that when a user's eye gaze moves into a logical area, the one or more interface graphics for the one or more input controls are displayed for the one or more corresponding interface controls within the logical area.

18. The method of claim 17, further comprising dynamically determining a number of logical areas to divide the display into based on one or more of a number of interface controls presented on the display and a distance of a user from the display.

19. The method of claim 13, wherein the input device comprises a wireless pointing device, a focus of the pointing device being the identified area of the display where the user's eye gaze is detected.

20. A program product comprising a non-transitory computer-readable storage medium that stores code executable by a processor, the executable code comprising code to:
  determine a field of view of a user based on a distance between the user and a display;
  identify an area of the display that is within an eye gaze of the user in the determined field of view, the user's eye gaze being a portion of the user's field of view;
  track the user's eye gaze in relation to the display using an eye-tracking device;
  determine one or more interface controls presented on the display that are within the identified area of the user's eye gaze, the one or more interface controls comprising interactive graphical elements that trigger an action for an application;
  dynamically map the determined one or more interface controls to one or more corresponding input controls on an input device such that actuation of an input control on the input device activates the corresponding interface control presented on the display in response to the user's eye gaze being maintained within the identified area of the display where the one or more interface controls are located for a predefined period of time; and
  display interface graphics on the display that represent the one or more input controls of the input device that correspond to the one or more interface controls, the interface graphics for the one or more input controls comprise graphical icons that are displayed using graphics that have shapes and labels that map to the shapes and labels of the input controls on the input device.

* * * * *